United States Patent
Chen et al.

(10) Patent No.: US 11,346,573 B2
(45) Date of Patent: May 31, 2022

(54) METHOD AND SYSTEM FOR PROVIDING AIR CONDITIONING

(71) Applicant: MIDEA GROUP CO., LTD., Guangdong (CN)

(72) Inventors: Xin Chen, San Jose, CA (US); Zhicai Ou, Guangdong (CN); Hua Zhou, San Jose, CA (US); Rubao Ma, Foshan (CN)

(73) Assignee: MIDEA GROUP CO., LTD., Foshan (CN)

( * ) Notice: Subject to any disclaimer, the term of this patent is extended or adjusted under 35 U.S.C. 154(b) by 402 days.

(21) Appl. No.: 16/466,893

(22) PCT Filed: Feb. 26, 2018

(86) PCT No.: PCT/CN2018/077294
§ 371 (c)(1),
(2) Date: Jun. 5, 2019

(87) PCT Pub. No.: WO2019/161575
PCT Pub. Date: Aug. 29, 2019

(65) Prior Publication Data
US 2021/0356161 A1 Nov. 18, 2021

(51) Int. Cl.
*F24F 11/65* (2018.01)
*F24F 11/64* (2018.01)
(Continued)

(52) U.S. Cl.
CPC .............. *F24F 11/65* (2018.01); *F24F 11/64* (2018.01); *G05B 19/042* (2013.01); *F24F 2120/14* (2018.01); *G05B 2219/2614* (2013.01)

(58) Field of Classification Search
CPC .......... F24F 11/65; F24F 11/64; G05B 19/042
(Continued)

(56) References Cited

U.S. PATENT DOCUMENTS 10,371,399 B1 * 8/2019 Rodriguez ............... F24F 11/56
2017/0163909 A1 * 6/2017 Nakash ..................... G06T 7/20
(Continued)

FOREIGN PATENT DOCUMENTS

CN 106152408 A * 11/2016
CN 106152408 A 11/2016
(Continued)

OTHER PUBLICATIONS

American Group Co., Ltd. The First Office Action, CN Application No. 201880089823.2, dated Mar. 16, 2021, 16 pgs.
(Continued)

*Primary Examiner* — Mohammad Ali
*Assistant Examiner* — Joshua T Sanders
(74) *Attorney, Agent, or Firm* — Morgan, Lewis & Bockius LLP

(57) ABSTRACT

An air conditioning system includes one or more cameras, one or more air conditioning operation units, and an air conditioner control unit that obtains, via the one or more cameras, images of a surrounding environment of the air conditioning operation units, and determines a first set of factors, including a layout of the surrounding environment, based on analysis of the images through predefined machine learning models. The control unit, in accordance with the first set of factors that has been determined based on the analysis of the images through the predefined machine learning models, selects a first operation profile from a plurality of predefined operation profiles to control the air conditioning operation units.

17 Claims, 4 Drawing Sheets

(51) Int. Cl.
*G05B 19/042* (2006.01)
*F24F 120/14* (2018.01)

(58) Field of Classification Search
USPC .......................................................... 700/276
See application file for complete search history.

(56) References Cited

U.S. PATENT DOCUMENTS

2017/0220887 A1* 8/2017 Fathi .................. G06K 9/00208
2018/0120793 A1* 5/2018 Tiwari .................... G05B 15/02

FOREIGN PATENT DOCUMENTS

| | | | |
|---|---|---|---|
| CN | 106440201 A | | 2/2017 |
| CN | 206131153 U | | 4/2017 |
| CN | 107166645 A | | 9/2017 |
| CN | 107246704 A | * | 10/2017 |
| CN | 107246704 A | | 10/2017 |
| CN | 107660290 A | | 2/2018 |
| JP | 5595165 B2 | | 9/2014 |
| WO | WO2010125804 A1 | | 11/2010 |

OTHER PUBLICATIONS

Midea Group Co. Ltd., International Search Report and Written Opinion, PCT/CN2018/077294, dated Nov. 14, 2018, 9 pgs.
American Group Co., Ltd., The Second Office Action, CN Application No. 201880089823.2, dated Oct. 8, 2021, 16 pgs.

* cited by examiner

METHOD AND SYSTEM FOR PROVIDING AIR CONDITIONING

FIELD OF THE TECHNOLOGY

The present disclosure relates to the field of air conditioning, and in particular, to a method and system for adaptively controlling an air conditioner and cool airflow based on information provided by computer vision and machine learning.

BACKGROUND OF THE TECHNOLOGY

Air conditioners are electronic appliances that, through heating, cooling, humidifying or dehumidifying, controlling air flow, etc., maintain air in a predefined space (e.g., a room, a hall, etc.) in a predefined state, e.g., including keeping the temperature within a predefined temperature range, and/or keeping the humidity at a predefined humidity level, and so on. Air conditioners are typically controlled in accordance with manual settings and/or preprogrammed operation profiles. Conventional air conditioners are typically installed and their operation profiles set by users without on-site or real-time guidance. In addition, conventional air conditioners are only able to automatically switch between preset operation profiles in accordance with preselected trigger conditions (e.g., based on a timer, or a temperature threshold, etc.). These limitations make it difficult to optimize the operation of the air conditioners and waste energy and compromise comfort of the users.

SUMMARY

As discussed in the background, a conventional air conditioning unit does not take into account the varied conditions in different installation settings and operating environments and cannot provide on-site guidance or real-time adjustments to the installation and/or the operation of the air conditioning unit in accordance with the varied conditions in the different installation settings and operating environments. The embodiments disclosed herein utilize computer vision and local intelligent decision-making to address at least some of the shortcomings of the conventional air conditioning systems and control methods thereof.

With advance of deep learning, computer vision has achieved a big progress in various areas. The information extracted from images is accurate enough to be used for further applications.

As disclosed herein, in some embodiments, a method of controlling air conditioning unit includes: at an electronic device having one or more processors and memory, the electronic device communicably coupled to one or more cameras and one or more air conditioning operation units: obtaining, via the one or more cameras, one or more images of a surrounding environment of the air conditioning operation units; determining a first set of factors, including a layout of the surrounding environment of the air conditioning operation units, based on analysis of the one or more images through one or more predefined machine learning models, wherein the layout specifies at least a first depth of the surrounding environment in a first direction away from the one or more air conditioning units, and a second depth of the surrounding environment in a second direction away from the one or more air conditioning units that is different from the first direction; and in accordance with the first set of factors that has been determined based on the analysis of the one or more images through the one or more predefined machine learning models, selecting a first operation profile from a plurality of predefined operation profiles, wherein each predefined operation profile of the plurality of operation profiles specifies a respective value range for each control parameter of a plurality of predefined control parameters for controlling the one or more air conditioning operation units.

In some embodiments, the method includes modifying a respective value range of at least one of the plurality of predefined control parameters in the first operation profile in accordance with the first set of factors that has been determined based on the analysis of the one or more images through the one or more predefined machine learning models.

In some embodiments, the method includes: determining a second set of factors, including a state of an object recognized in the surrounding environment of the air conditioning operation units, based on the analysis of the one or more images through the one or more predefined machine learning models; and in accordance with the second set of factors that has been determined based on the analysis of the one or more images through the one or more predefined machine learning models, selecting a current value of a first control parameter of the first operation profile within the respective value range that has been modified in accordance with the first set of factors, to operate the one or more air conditioning operation units.

In some embodiments, the first set of factors includes a position of a window in the surrounding environment of the one or more air conditioning operation units and the second set of factors includes an open/closed state of the window.

In some embodiments, the first set of factors includes a position of a first type of furniture in the surrounding environment of the one or more air conditioning operation units, and the second set of factors includes presence or absence of people at the position of the first type of furniture in the surrounding environment of the one or more air conditioning operation units.

In some embodiments, the second set of factors includes a motion state of the people at the position of the first type of furniture in the surrounding environment of the one or more air conditioning operation units.

In some embodiments, the second set of factors includes a temperature state of the people at the position of the first type of furniture in the surrounding environment of the one or more air conditioning operation units.

In some embodiments, an air conditioner system includes one or more cameras, an air conditioning operation unit, and an air conditioner control device that performs any of the methods described herein. In accordance with some embodiments, an electronic device includes one or more processors, and memory storing one or more programs; the one or more programs are configured to be executed by the one or more processors and the one or more programs include instructions for performing or causing performance of the operations of any of the methods described herein. In accordance with some embodiments, a computer readable storage medium has stored therein instructions, which, when executed by an electronic device, cause the device to perform or cause performance of the operations of any of the methods described herein. In accordance with some embodiments, an electronic device includes: means for capturing images, means for performing air conditioning operations, and means for performing or causing performance of the operations of any of the methods described herein.

Various advantages of the present application are apparent in light of the descriptions below.

BRIEF DESCRIPTION OF THE DRAWINGS

The aforementioned features and advantages of the disclosed technology as well as additional features and advantages thereof will be more clearly understood hereinafter as a result of a detailed description of preferred embodiments when taken in conjunction with the drawings.

To describe the technical solutions in the embodiments of the present disclosed technology or in the prior art more clearly, the following briefly introduces the accompanying drawings required for describing the embodiments or the prior art. Apparently, the accompanying drawings in the following description show merely some embodiments of the present disclosed technology, and persons of ordinary skill in the art may still derive other drawings from these accompanying drawings without creative efforts.

Like reference numerals refer to corresponding parts throughout the several views of the drawings.

DESCRIPTION OF EMBODIMENTS

Reference will now be made in detail to embodiments, examples of which are illustrated in the accompanying drawings. In the following detailed description, numerous specific details are set forth in order to provide a thorough understanding of the subject matter presented herein. But it will be apparent to one skilled in the art that the subject matter may be practiced without these specific details. In other instances, well-known methods, procedures, components, and circuits have not been described in detail so as not to unnecessarily obscure aspects of the embodiments.

The following clearly and completely describes the technical solutions in the embodiments of the present application with reference to the accompanying drawings in the embodiments of the present application. Apparently, the described embodiments are merely a part rather than all of the embodiments of the present application. All other embodiments obtained by persons of ordinary skill in the art based on the embodiments of the present application without creative efforts shall fall within the protection scope of the present application.

Figure 1:
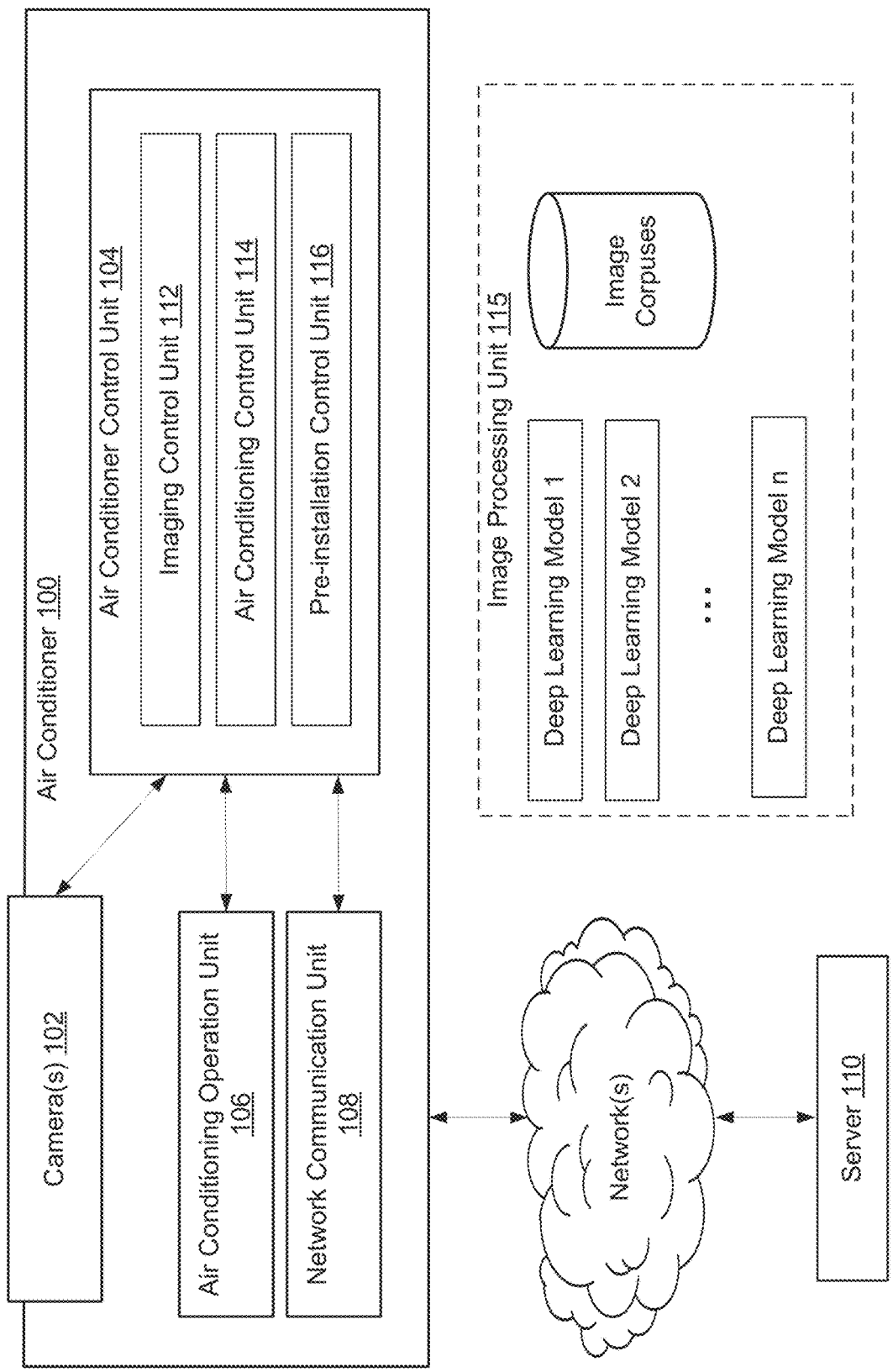
FIG. 1 is a block diagram of an air conditioner in accordance with some embodiments.

FIG. 1 is a block diagram of an air conditioner 100 in accordance with some embodiments. As shown in FIG. 1, the air conditioner 100 includes one or more onboard cameras 102, an air conditioner control unit 104, and an air conditioning operation unit 106. In some embodiments, the air conditioner 100 further includes a network communication unit 108 that communicates with a remote server 110 via one or more networks (e.g., a local area network (LAN), a wide area network (WAN), and/or the Internet). In some embodiments, the air conditioner control unit 104 further includes imaging control unit 112 for controlling the one or more cameras 102, and an air conditioning control unit 114 for controlling the air conditioning operation unit 106. In some embodiments, the air conditioner control unit 104 further includes a pre-installation control unit 116 for providing real-time installation guidance before and during installation of the air conditioner 100. In some embodiments, the air conditioner is connected to a power source (e.g., an electric outlet) or has an onboard power supply (e.g., a battery or a generator). In some embodiments, the air conditioner control unit 104 further includes an image processing unit 115 which includes a plurality of machine learning models for analyzing the images from the one or more cameras 102, and provide a layout of the operating environment for the air conditioner, and recognizes objects and states of objects within the operating environment. In some embodiments, the image processing unit 115 optionally include some components locally at the air conditioner 100, and some components remotely at the server 110.

In some embodiments, the air conditioner 100 is a window air conditioner that is installed in a window opening, with a front side of the air conditioner 100 facing the interior of an enclosed or semi-enclosed space (e.g., a room, a hall, a shed, a shipping container, a mobile home, a trailer, etc.), and a back side of the air conditioner facing the exterior of the enclosed or semi-enclosed space. In some embodiments, the air conditioner 100 is entirely located within the interior of the enclosed or semi-enclosed space, and a vent system (e.g., tube, tunnel, etc.) that is open to the exterior of the enclosed or semi-enclosed space is coupled to the air conditioner for heat exchange/exhaust purposes.

In some embodiments, the air conditioner 100 includes a mounting bracket that forms part of the mounting system that affixes the air conditioner to a wall or ceiling of the enclosed or semi-enclosed space. In some embodiments, the mounting bracket is controlled by one or more motors and actuators that are controlled (e.g., controlled via a remote control device operated by a user, or controlled automatically by the air conditioner control unit 104) to change an orientation of the air conditioner (e.g., the tilt and yaw of the plane of the front-side of the air conditioner) relative to the wall or ceiling of the enclosed or semi-enclosed space.

In some embodiments, the air conditioner includes one or more cameras 102. In some embodiments, a single camera is placed on the front side of the air conditioner (e.g., near the center of the upper or lower edge of the front side of the air conditioner's enclosure). In some embodiments, the camera is mounted on a platform with one or more actuators that are controlled (e.g., controlled via a remote control operated by a user, or controlled automatically by the air conditioner control unit 104) to change an orientation and/or location of the camera (e.g., by changing the tilt and yaw of the plane of the front-side of the camera or air conditioner, or anchor position of the camera) relative to a reference point (e.g., a fixed point on the front side of the air conditioner enclosure), to provide stereo imaging capability to the air conditioner 100. In some embodiments, two cameras are placed at two opposing corners of the air conditioner (e.g., in proximity to the two upper corners of the front side of the enclosure, in proximity to the two opposing corners along a diagonal of the front side of the enclosure, etc.) to provide stereo imaging capability to the air conditioner.

In some embodiments, the camera(s) 102 included on the air conditioner include image sensors for different wavelengths and/or intensities, such as infrared sensors, visible light sensors, night-vision sensors, and/or motion sensors, etc. In some embodiments, the cameras are operated on a continuous basis and produce continuous streams of image frames. In some embodiments, some cameras (e.g., infrared camera or low-light camera) are activated to capture images when one or more predefined events have been detected in the images captured by other cameras (e.g., visible light camera, etc.). For example, in some embodiments, when the air conditioner is operated in accordance with the night mode (e.g., an operation profile selected for the night hours), the night-vision camera is only activated to capture an image in response to a detection of a predefined motion event (e.g., more than a threshold amount of movement (e.g., movements less than x minutes apart) of a heat producing object (e.g., a person) for more than a predefined threshold amount of time (e.g., for more than 5 minutes) by the infrared camera. For example, the above movement pattern detected by the infrared camera may indicate that the room temperature is uncomfortable for the person, and the air conditioner control unit 104 activates the night-vision camera to take a picture in response to detection of the above movement pattern in the images captured by the infrared camera, and re-evaluates of the room layout and object states to determine whether the current operating condition of the air conditioner is different from that associated with the currently selected air conditioner operation profile and/or operation control parameter values. If the air conditioner control unit 104 determines that the current room layout and object states (e.g., addition of people or furniture in the room, changing in furniture position, change of the curtain material on the windows, number and/or positions of open windows, etc.) have changed from those used to select the current air conditioner operation profile and operation control parameter values, the air conditioner control unit 104 selects a new operation profile or adjust one or more operation control parameter values of the current operation profile in accordance with the current layout and object states.

In some embodiments, the air conditioning operation unit 106 includes a compressor, refrigerant, an evaporator, a condenser, an expansion valve, fans, air filters (e.g., particle filters, and filters for various contaminants and toxins in the air, moisture filters, etc.), one or more sensors (e.g., a thermostat, a humidity sensor, an air flow sensor, valve pressure sensors, timers, etc.). The cold side of an air conditioner contains the evaporator and a fan that blows air over the chilled coils and into the room. The hot side contains the compressor, condenser and another fan to vent hot air coming off the compressed refrigerant to the outdoors. In between the two sets of coils, there is an expansion valve. It regulates the amount of compressed liquid refrigerant moving into the evaporator. The air conditioning operation unit 106 operates in accordance with a set of control parameters specified in a currently selected operation profile. The air conditioning operation unit 106 provides real-time feedback regarding the operating state of the air conditioning operation unit 106, the sensor readings, and any error states to the air conditioner control unit 104. The air conditioner control unit 104 in turn adjusts the control parameters (e.g., air flow directions, fan speeds, power, humidity setting, etc.) and/or operation profiles (e.g., a combined set of control parameters that are used together) based on the real-time feedback from the air conditioning operation unit 106, as well as user inputs and information received from the cameras 102.

In some embodiments, the air conditioner control unit 106 includes one or more processors, and memory. The memory stores instructions which when executed by the one or more processors, cause the processors to perform functions described herein to provide real-time guidance regarding the installation of the air conditioner, to control the functions of the one or more cameras 102, and/or to control operation of the air conditioning operation unit 106.

In some embodiments, the air conditioner control unit 106 includes a pre-installation control unit 116. In some embodiments, before the air conditioner 100 is fully affixed to its final deployment location on an interior wall or within an window opening, the air conditioner control unit 106 is activated in the pre-installation control mode in which the pre-installation control unit 116 controls the one or more cameras 102 to capture one or more images of the room from a current vantage point of the air conditioner 100. For example, the air conditioner 100 is optionally placed at a proposed position on the wall, ceiling, or within a window opening, before the air conditioner 100 is permanently affixed to that position; and when the air conditioner 100 is powered on, the pre-installation control unit 116 is activated instead of the air conditioning control unit 114. The pre-installation control unit 116 instructs the one or more cameras 102 to capture one or more images from the current vantage point of the air conditioner 100. The pre-installation control unit 116 optionally processes the images locally to determine the dimensions of the room and its own current position in the room. The image processing that is performed locally can be relatively rudimentary with relatively limited on-board processing capabilities of the air conditioner 100. For example, the images may be binarized and edges of the walls and windows are identified from the binarized images using various existing edge detection techniques. In some embodiments, the pre-installation control unit 116 optionally contacts a remote backend server 110 via the network communication unit 108 and transmits the captured images to the server 110, wherein the server 110 performs the image analysis. In some embodiments, the image analysis is performed by the image processing unit 115 which utilizes a plurality of machine learning models (e.g., deep learning models) to recognize furniture types and determine furniture layout in the room, e.g., position and dimensions of the desk, table, bed, couch, exercise equipment, etc. where people may remain in an extended period of time versus positions and dimensions of bookshelves, chest of drawers, nightstands, TV, oven, etc. near which people typically only linger a limited amount time. In some embodiments, different machine learning models are used to process the images to recognize different types of furniture in the room and determine their respective states, and the results from the different machine learning models are integrated by the image processing unit 115 to produce the final analysis result. For example, different machine learning models are used process images from different cameras and images of different types of objects, such as a heat map processing model for analyzing infrared images, a low light processing model for analyzing images from the night vision camera, and a color image processing model for analyzing images from the visible light camera, and a window image processing model for identifying windows in the images and determining the open/closed states of the windows, a couch image processing model for identifying couches and determining the number of people present on the couch, etc. In some embodiments, training of a model can be performed on the server initially when the air conditioner is first installed, and the trained model is transmitted to the air conditioner 100 after sometime such that the image processing unit 115 performs the image analysis locally for newly captured images. This can reduce server load, and improve privacy protection for the user. In some embodiments, the air conditioner 100 detects a change in room layout (e.g., based on the fact that the user frequently adjusts the automatically selected and adjusted operation profile, or capturing images that are drastically different from previously captured images) and requests the server to retrain the model for the new room layout and obtains a newly trained model from the server after sometime.

In some embodiments, based on the result of the image analysis, the pre-installation control unit 116 optionally controls the actuators attached to the cameras 102 to change the angle and/or location of the cameras 102 to capture additional images of the room and refine the determination of the room dimensions, furniture layout, and the air conditioner's current position in the room. In some embodiments, based on the result of the image analysis, the pre-installation control unit 116 provides a suggestion regarding optimal locations in the room that the air conditioner should be permanently installed. In some embodiments, the air condition includes a control panel or is wirelessly connected to a remote control device (e.g., a smartphone or tablet device) which provides an image of the room layout that is determined from the image analysis, and allows the user to make any corrections or annotations regarding the nature of the objects identified and represented in the image of the room layout. For example, if a desk is incorrectly identified as a couch, the user has an opportunity to enter an input to correct that mistake manually. In some embodiments, the suggested locations of the air conditioner are highlighted in the image of the room layout. In some embodiments, the backend server 110 provides the suggested installation locations. In some embodiments, the suggestions are provided based on one or more pre-established principles, such as optimizing energy efficiency, aesthetics, ease of installation, comfort of the users, etc. In some embodiments, when a balance cannot be achieve for all the above factors, the air conditioner prompts the user to select different priorities of the above factors and provide one or more alternative suggestions that have been generated based on the selected priorities. In some embodiments, the air conditioner presents a few alternative suggestions and listings the balance of the different factors for each of the alternative suggestions.

In some embodiments, once the air conditioner 100 is installed to its permanent position, e.g., in accordance with the location suggested by the pre-installation control unit 116, when the air conditioner is restarted, the air conditioner activates the air conditioning control mode, and the air conditioning control unit 114 provides the instructions to operate the air conditioning operation unit 106 in accordance with a set of control parameters selected for the current position of the air conditioner and the current room layout that has been determined. For example, the target temperature, the air flow directions, the air flow pattern, the rate of heat exchange, the length of the operation cycles, etc. are selected based on the dimensions of the room, whether there is a window in front or to the side of the air conditioner, whether there is a person directly in front of the air conditioner, whether a person is moving a lot or substantially stationary, whether there are multiple people in the room, the locations and capacities of heat sinks (e.g., fish tank, open cooler with ice, etc.) and heat sources (e.g., operating oven, TV, etc.) in the room, etc.

In some embodiments, the air conditioning control unit 114 periodically captures images using the one or more cameras, and performs image analysis to determine whether substantial changes have occurred in the room layout and/or object states. In some embodiments, the air conditioning control unit 114 compares the images that are newly taken with the most recent images to determine if sufficient changes have occurred that indicate a change in the room layout and object states. The change in the images are analyzed to determine whether the images are changing due to layout change or due to change in the time of day or weather change, or change in the state of the window coverings or lighting. Various statistical learning, models or artificial intelligence models can be used to make these determinations. The different kinds of changes are used to make different kinds of adjustments to the operation parameters of the air conditioning operation unit 106.

In some embodiments, before making actual changes to the operating parameters or selecting a different operation profile to the air conditioning operation unit 106, the air conditioning control unit 116 optionally sends the proposed changes to the control panel or user interface on a mobile device (e.g., smartphone or tablet device) connected wirelessly to the air conditioner 100, and requests a confirmation from the user to execute the changes.

Figure 2:
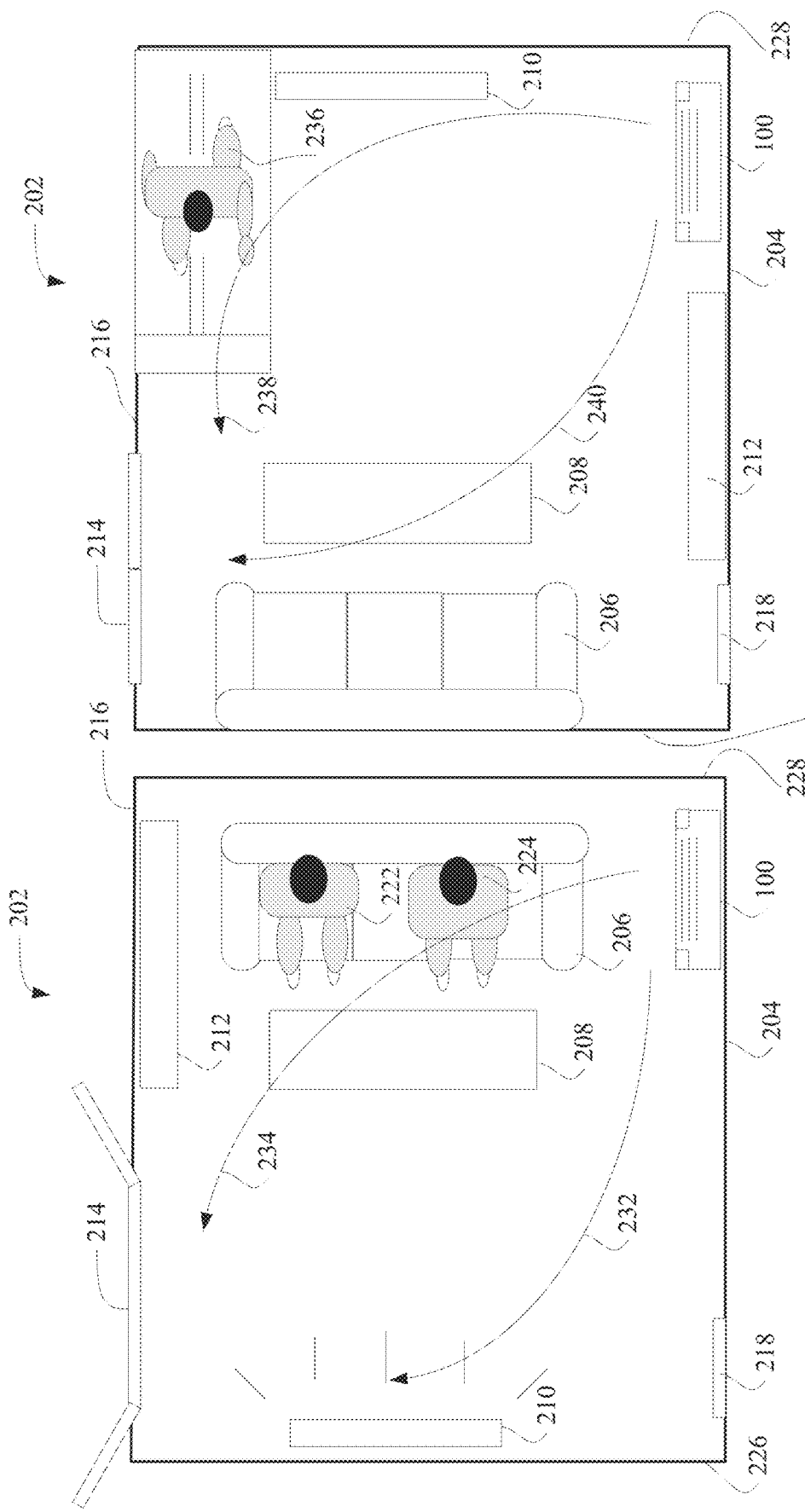
FIGS. 2A-2B are block diagrams illustrating an operating environment of the air conditioner in accordance with some embodiments.

FIG. 2A is a top view of an example operating environment of the air conditioner 100. In a room 202, the air conditioner 100 is installed at a first position in the room 202 (e.g., on wall 204 near an upper corner of the room, near a wall 228). There is a couch 206, a coffee table 208, a TV 210, and a bookshelf 212 placed in the room 202 as shown in FIG. 2A. There is also a window 214 on wall 216 on the opposite side of wall 204. An entry 218 of the room is on the wall 204 adjacent to a wall 226. The window 214 is open. Two people 222 and 224 are sitting on the couch 206. The time of day is evening, and the outside temperature is cool. The camera(s) on the air conditioner 100 has captured a number of pictures of the room 202 from its current vantage point. The images are optionally captured from two slightly different positions on the front of the air conditioner 100 (e.g., using two or more cameras or using a camera whose position is adjustable), to allow depth determination of the objects in the room 202. Based on image analysis performed locally at the air conditioner 100, and optionally image analysis performed remotely at a server 110, the layout of the room 202 is determined and the nature of the objects in the room 202 are also determined. For example, the positions of the objects are determined and the object recognized based on computer vision techniques. In addition, the states of one or more of the recognized objects are also determined. For example, an infrared heat map (e.g., captured by an infrared camera of the air conditioner 100) of the room 202 is used in conjunction with the full color images of the room to determine that the window 214 is open (e.g., based on flow of cool air coming through the window), that two people are sitting on the couch 206 (e.g., based on body heat patterns hovering over the couch 206), and that the TV is on (e.g., based on changing light and colors in front of the TV 210 and heat radiated from the TV). Based on the room layout (e.g., dimensions of the room 202, the locations of the walls, window, entry, furniture, people, etc.), the states of the objects in the room (e.g., people sitting for extended period of time, TV being on, window being open to let in cool air), and other external factors (e.g., time of day, schedule of people in the house, outside weather, electricity cost at different times of day, etc.), the air conditioning control unit 114 selects an operation profile from a plurality of predefined and stored operation profiles, to control how the air conditioning operation unit 106 should operate.

In some embodiments, the factors that the air conditioning control unit 114 takes into consideration are put into multiple different tiers. For example, one tier of factors (e.g., typically relatively fixed factors, such as the room dimensions, positions and types of large pieces of furniture, position and number of windows and doors, etc.) are used to select the operation profile from a plurality of predefined operation profiles which are distinct and few in number (e.g., 5-10 profiles). The operation profiles are pre-stored in the air conditioning control unit 114, and have been established through research and usage study by the manufacturer of the air conditioner to be suitable in most cases for most consumers for a set of common baseline conditions. For example, a winter bedroom operation profile, a spring living room profile, a summer energy efficient profile, a winter comfort profile, etc. Each operation profile has a set value range for each control parameter of a plurality of control parameters of the air conditioning operation unit, and a corresponding default baseline value within that set value range. In some embodiments, the baseline operation profiles are tailored to the particular room layout. For example, the baseline operation profile selected by the air conditioning control unit is further modified in accordance with the same set of factors or a subset thereof (e.g., room dimensions (size and aspect ratio), position and types of furniture, position and size of windows and doors, position of other heat sources and heat sinks (e.g., fans, oven, large appliances, fish tanks, etc.), and so on) by the air conditioning control unit 114.

In some embodiments, the room layout and general state of the room are learned through images taken over the course of several days and weeks or even months to years. In some embodiments, the determination of the layout and objects are gradually improved overtime as more images become available under different lighting and user occupation conditions. Consequently, a different profile may be chosen by the air conditioning control unit based on the additional information (e.g., identification of additional objects in the room and their nature). The tailored operation profiles are similar to the preconfigured profiles in that the operation parameters are each established in terms of a set value range and a default value for the value range.

In some embodiments, a second tier of factors include factors that change more frequently over the short-term. For example, the number and positions of people in the room (e.g, close to vs. far away from the air conditioner, facing toward vs. facing away from the air conditioner, in front of a window vs. in front of a wall, lying down vs. standing, etc.), the state of the windows and doors (e.g., open vs. closed in combination with different time of day, season, weather conditions, etc.; curtain drawn vs. curtain open, etc.), the state of large appliances (e.g., oven on vs. oven off, TV on vs. TV off, fan on vs. fan off, shower on vs. shower off, etc.), the motion state of people in the room (e.g., working out on a treadmill vs. sleeping in bed vs. sitting in front of a desk, etc.). Based on the above second tier factors, the air conditioning control unit varies the values of the different parameters for controlling the air conditioning control unit within the value ranges set by the currently selected operation profile, where the profile has been selected based on the first tier factors.

As shown in FIG. 2A, an operation profile has been selected for the room in the layout and state shown in FIG. 2A. The selected profile is a tailored summer energy efficiency profile which dictates that the air conditioner operates at full capacity until current room temperature (e.g., 90 degrees) is lowered to the outside temperature (e.g., in accordance with a determination that the window is open and cooler air is coming into the room). Once the room temperature has reached the equilibrium with outside temperature (e.g., 80 degrees), the air conditioner control unit notifies the user to provide an input regarding whether he/she wishes to continue with the cooling of the room with the window open (e.g., till the preset temperature for the current time of day (e.g., 75 degrees) is reached). Subsequently, absent an input from the user or upon an affirmative input for continued cooling, the air conditioning control unit instructs the air conditioning operation unit to cool the room at 50% capacity if the window remains open, and cools the room at full capacity if the window is closed (e.g., the state of the window is analyzed based on the images captured after the notification to the user is issued). In some embodiments, the air conditioning control unit further determines that the users are sitting in front of the air conditioner 100 and facing the wall 226 based on image analysis, and accordingly, the air conditioning control unit instructs the air conditioning operation unit to reduce the airflow speed when the fans are blowing directly in the direction of the users 222 and 224, and to increase speed when the fans are blowing in a direction toward other portions of the room. For example, the arrow 230 indicates direction of airflow in the room caused by the airflow coming out of the air conditioner operation unit when the fans turn in the direction from wall 228 to wall 226 (e.g., the fans oscillate from side to side in addition to rotating around their central axes); and the arrow 232 indicates direction of airflow in the room caused by the airflow coming out of the air conditioner operation unit when the fans turn in the direction from wall 226 to wall 228. The airflow pattern created by the movement of the fans and the varying speeds of the fans ensures that the heat generated from the TV is pushed toward the window, and the airflow do not over-chill the area at which the people are sitting. In some embodiments, if the air conditioning control unit determines that the heat radiation patterns around the users 222 and 224 indicate a higher than a normal value, the air conditioning control unit instructs the air conditioning operation unit to increase the fan speed when the fans are blowing in the direction toward the users. In some embodiments, in accordance with a determination that the TV state is on, and the TV is radiating heat, the air conditioning control unit instructs the air conditioning operation unit to change the speed of the fans when the fans are blowing in the direction of the TV in a pattern that creates air flow driving heat from the TV 210 toward the open window 214 or other parts of the room unoccupied by people, such that the heat radiated by the TV has less impact on the temperature of the air near the users.

FIG. 2B illustrates that, after the air conditioner 100 has operated in the room 202 in the configuration shown in FIG. 2A for some time, the air conditioner 100 captures additional images that indicate changes in the room 202. Based on analysis of the images captured by the cameras of the air conditioner, the air conditioner determines that the room layout has changed. The new room layout includes new positions of furniture and addition of a treadmill 234. Based on the image analysis, the air conditioner control unit 114 determines the new layout to be that shown in FIG. 2B. For example, in accordance with the infrared image of the room, the state of the window 214 is determined to be closed based on heat radiation pattern from the window and absence of airflow from the window 214. Based on the image comparison of the couch 206 in multiple images overtime, the air conditioner control unit determines that the couch 206 has been moved to near wall 226 and that there is no one currently sitting on the couch 206. Based on image comparison of images of the object next to the window 214 and images of other known objects, the air conditioner control unit determines that the object is a treadmill 234 and that the treadmill 234 is placed against the wall 216 next to the window 214. Based on comparisons of the images of the treadmill captured over time and optionally based on the heat map of the room, the air conditioner control unit determines that a person 236 is running on the treadmill 234. Based on the above analysis, and determination, the air conditioner control unit determines that the operation profile needs to be adjusted. In some embodiments, since many of the first tier factors of the room have not changed (e.g., the size and dimensions of the room, the number and positions of the windows and doors, the season, etc.) have not changed, the air conditioner control unit optionally keeps the baseline operation profile, and adjusts the ranges for some of the parameters based on the new layout of the room to generate a tailored operation profile. For example, since the location of the couch 206 has changed, the tailored operation profile may be slightly different from the tailor operation profile for the room layout shown in FIG. 2A. For example, since couch 206 is now near the window 214 and can be relatively hot due to the sun shining through the window, the room temperature range is lowered by 1 degree overall. Based on the tier two factors, the operation parameters of the air conditioner are further adjusted. For example, the air conditioner is turned on at full capacity to cool the room down to the target temperature in accordance with a determination that the window state is closed. In addition, there is no restriction placed on the airflow speed coming out of the air conditioner 100 when the fan is blowing toward the couch 206 because there is no one sitting on the couch 206 at the present time. In addition, based on the motion and heat radiation patterns present near the treadmill 234, the air conditioning control unit 114 instructs the air conditioning operation unit 106 to increase the airflow speed when the fans are blowing in the direction of the treadmill 234 to provide additional cooling to the user 236 running on the treadmill 234. The airflow pattern in the room created by the direction and varying speeds of airflow coming out of the air conditioner 100 as shown in FIG. 28 are different from that shown in FIG. 2A because of the adjustments made by the air conditioning control unit. For example, the arrow 238 indicates direction of airflow in the room caused by the airflow coming out of the air conditioner operation unit when the fans turn in the direction from wall 228 to wall 226 (e.g., the fans oscillate from side to side in addition to rotating around their central axes); and the arrow 240 indicates direction of airflow in the room caused by the airflow coming out of the air conditioner operation unit when the fans turn in the direction from wall 226 to wall 228. The airflow pattern created by the movement of the fans and the varying speeds of the fans ensures that the cooling is focused on the user running on the treadmill, and not focused on the couch where no one is currently present. In some embodiments, if the air conditioning control unit determines that the heat radiation patterns around the user 236 indicate a higher than a normal value, the air conditioning control unit instructs the air conditioning operation unit to increase the fan speed when the fans are blowing in the direction toward the users or lower the target temperature for the entire room.

The above examples are provided merely for illustrative purposes. More details of the functions of the air conditioning control unit 116 are set forth below with respect to the flowchart shown in FIG. 3.

Figure 3:
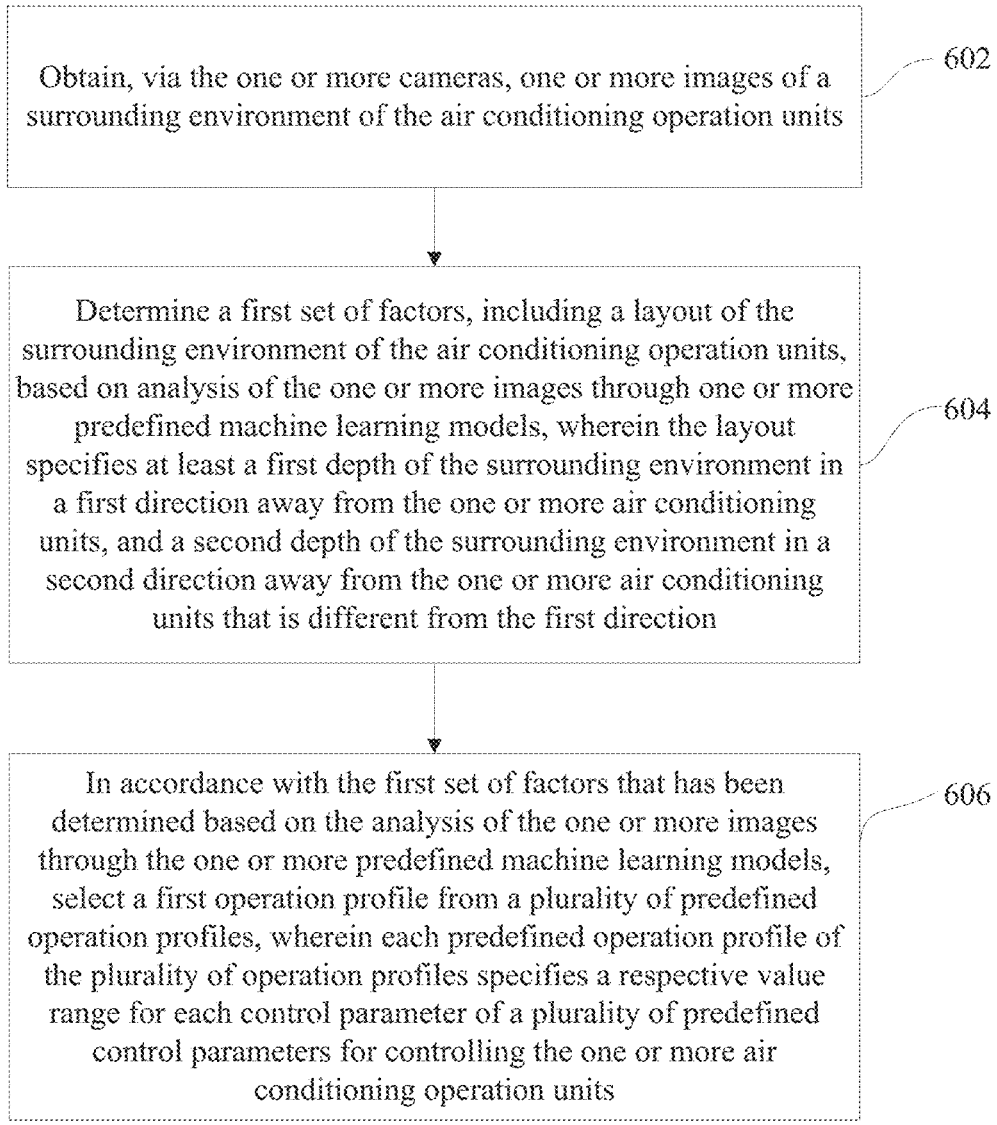
FIGS. 3 is a flowchart diagram of a method of providing air conditioning in accordance with some embodiments.

FIG. 3 is a flowchart diagram of a method 300 of providing air conditioning in accordance with some embodiments. In some embodiments, the method 300 is performed by an air conditioner (e.g., including an air conditioner control unit and an air conditioning operation unit). In some embodiments, the method 300 is performed by an air conditioner (e.g., including an air conditioner control unit, an air conditioning operation unit, and a network communication unit) in conjunction with a server (e.g., server 110). In some embodiments, method 300 is governed by instructions that are stored in a non-transitory computer readable storage medium and the instructions are executed by one or more processors of the air conditioner.

The method includes: at an electronic device having one or more processors and memory, the electronic device communicably coupled to one or more cameras and one or more air conditioning operation units (e.g., the electronic device is a smart air conditioner that includes a control unit with one or more processors and memory, one or more cameras that are external-facing on an enclosure of the air conditioner, and one or more air conditioning operation units that produce air conditioning outputs such as temperature-controlled and directed airflow to adjust temperature and humidity of a room according to one or more predefined control parameters (e.g., power, efficiency, temperature of air flow, air flow speed, air flow direction, etc.)): obtaining (302), via the one or more cameras, one or more images of a surrounding environment of the air conditioning operation units; determining (304) a first set of factors (e.g., tier one factors), including a layout of the surrounding environment of the air conditioning operation units, based on analysis of the one or more images through one or more predefined machine learning models, wherein the layout specifies at least a first depth of the surrounding environment in a first direction away from the one or more air conditioning units, and a second depth of the surrounding environment in a second direction away from the one or more air conditioning units that is different from the first direction; and in accordance with the first set of factors (e,g., tier one factors) that has been determined based on the analysis of the one or more images through the one or more predefined machine learning models (e.g., deep learning models), selecting (306) a first operation profile from a plurality of predefined operation profiles, wherein each predefined operation profile of the plurality of operation profiles specifies a respective value range for each control parameter of a plurality of predefined control parameters for controlling the one or more air conditioning operation units.

In some embodiments, the electronic device modifies a respective value range of at least one of the plurality of predefined control parameters in the first operation profile in accordance with the first set of factors that has been determined based on the analysis of the one or more images through the one or more predefined machine learning models. In some embodiments, the electronic device determines a second set of factors (e.g., tier two factors), including a state of an object recognized in the surrounding environment of the air conditioning operation units, based on the analysis of the one or more images through the one or more predefined machine learning models. In accordance with the second set of factors (tier two factors) that has been determined based on the analysis of the one or more images through the one or more predefined machine learning models, the electronic device selects a current value of a first control parameter of the first operation profile within the respective value range that has been modified in accordance with the first set of factors, to operate the one or more air conditioning operation units. In some embodiments, the first set of factors includes a position of a window in the surrounding environment of the one or more air conditioning operation units and the second set of factors includes an open/closed state of the window. In some embodiments, the first set of factors includes a position of a first type of furniture in the surrounding environment, and the second set of factors includes presence or absence of people at the position of the first type of furniture in the surrounding environment of the one or more air conditioning operation units. In some embodiments, the second set of factors includes a motion state of the people at the position of the first type of furniture in the surrounding environment of the one or more air conditioning operation units. In some embodiments, the second set of factors includes a temperature state of the people at the position of the first type of furniture in the surrounding environment of the one or more air conditioning operation units.

It should be understood that the particular order in which the operations in FIG. 3 have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods and/or processes described herein are also applicable in an analogous manner to method 300 described above.

Figure 4:
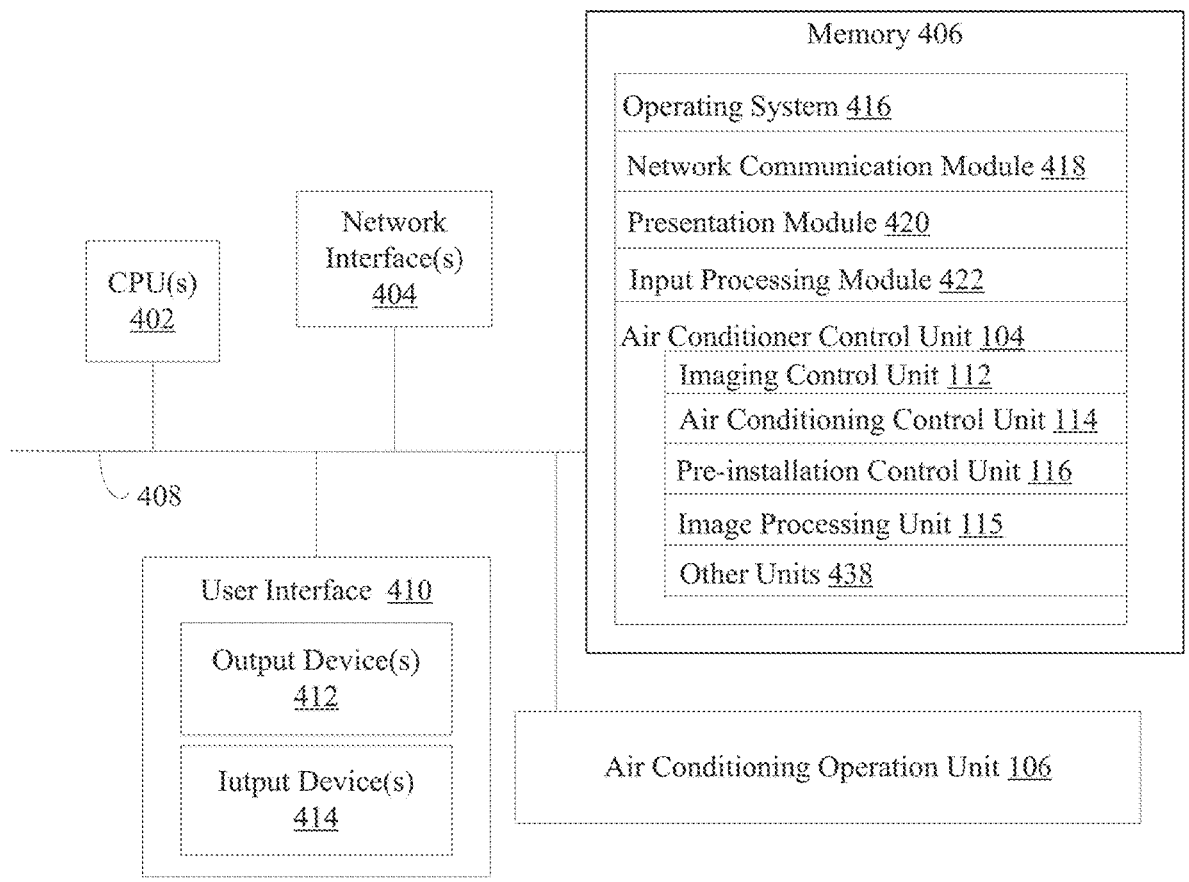
FIG. 4 is a block diagram of air conditioner in accordance with some embodiments.

FIG. 4 is a block diagram illustrating a representative air conditioner 100. The air conditioner includes one or more processing units (CPUs) 402, one or more network interfaces 404, memory 406, and one or more communication buses 408 for interconnecting these components (sometimes called a chipset). Air conditioner 100 also includes a user interface 410. User interface 410 includes one or more output devices 412 that enable presentation of media content, including one or more speakers and/or one or more visual displays. User interface 410 also includes one or more input devices 414, including user interface components that facilitate user input such as a keyboard, a mouse, a voice-command input unit or microphone, a touch screen display, a touch-sensitive input pad, a gesture capturing camera, or other input buttons or controls. Furthermore, some air conditioner 100 uses a microphone and voice recognition or a camera and gesture recognition to supplement or replace the keyboard. In some embodiments, air conditioner 100 further includes sensors, which senses operating environment information of the air conditioner 100. Sensors include but are not limited to one or more microphones, one or more cameras, an ambient light sensor, one or more accelerometers, one or more gyroscopes, a GPS positioning system, a Bluetooth or BILE system, a temperature sensor, humidity sensors, one or more motion sensors, one or more biological sensors (e.g., a galvanic skin resistance sensor, a pulse oximeter, and the like), and other sensors. Furthermore, the air conditioner 100 includes air conditioning operation unit 106 that includes a compressor, refrigerant, an evaporator, a condenser, an expansion valve, fans, air filters (e.g., particle filters, and filters for various contaminants and toxins in the air, moisture filters, etc.), and/or one or more sensors (e.g., a thermostat, a humidity sensor, an air flow sensor, valve pressure sensors, timers, etc.). Memory 406 includes high-speed random access memory, such as DRAM, SRAM, DDR RAM, or other random access solid-state memory devices; and, optionally, includes non-volatile memory, such as one or more magnetic disk storage devices, one or more optical disk storage devices, one or more flash memory devices, or one or more other non-volatile solid state storage devices. Memory 406, optionally, includes one or more storage devices remotely located from one or more processing units 402. Memory 406, or alternatively the non-volatile memory within memory 406, includes a non-transitory computer readable storage medium. In some implementations, memory 406, or the non-transitory computer readable storage medium of memory 406, stores the following programs, modules, and data structures, or a subset or superset thereof.

- operating system 416 including procedures for handling various basic system services and for performing hardware dependent tasks;
- network communication module 418 for connecting air conditioner 100 to other computing devices (e.g., a server system 110) or mobile control devices (e.g., smart phones or tablets) connected to one or more networks via one or more network interfaces 404 (wired or wireless);
- presentation module 420 for enabling presentation of information;
- input processing module 422 for detecting one or more user inputs or interactions from one of the one or more input devices 414 and interpreting the detected input or interaction;
- air conditioner control unit 104, which controls the air conditioner 100, including but not limited to:
    - imaging control unit 112 for controlling the one or more cameras and other sensors of the air conditioner 100;
    - air conditioning control unit 114 for controlling the air conditioning operation unit 106;
    - pre-installation control unit 116 for providing real-time on location guidance regarding installation of the air conditioner 100;
    - image processing unit 115 for performing image analysis of the images from the cameras of the air conditioner 100 to determine the room layout and object types and states in the room; and
    - other modules 438 for performing other functions set forth herein.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, modules or data structures, and thus various subsets of these modules may be combined or otherwise re-arranged in various implementations. In some implementations, memory 406, optionally, stores a subset of the modules and data structures identified above. Furthermore, memory 406, optionally, stores additional modules and data structures not described above.

While particular embodiments are described above, it will be understood it is not intended to limit the application to these particular embodiments. On the contrary, the application includes alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the embodiments.

The invention claimed is:

1. An air conditioning system, comprising:
    one or more cameras;
    one or more air conditioning operation units;
    one or more processors; and
    memory storing instructions, the instructions, when executed by the one or more processors cause the processors to perform operations comprising:

obtaining, via the one or more cameras, one or more images of a surrounding environment of the air conditioning operation units;

determining a first set of factors, including a layout of the surrounding environment of the air conditioning operation units, based on analysis of the one or more images through one or more predefined machine learning models, wherein the layout specifies at least a first depth of the surrounding environment in a first direction away from the one or more air conditioning units, and a second depth of the surrounding environment in a second direction away from the one or more air conditioning units that is different from the first direction;

in accordance with the first set of factors that has been determined based on the analysis of the one or more images through the one or more predefined machine learning models, selecting a first operation profile from a plurality of predefined operation profiles, wherein each predefined operation profile of the plurality of operation profiles specifies a respective value range for each control parameter of a plurality of predefined control parameters for controlling the one or more air conditioning operation units;

determining a second set of factors, including a state of an object recognized in the surrounding environment of the air conditioning operation units, based on the analysis of the one or more images through the one or more predefined machine learning models; and in accordance with the second set of factors that has been determined based on the analysis of the one or more images through the one or more predefined machine learning models, selecting a current value of a first control parameter of the first operation profile within the respective value range that has been modified in accordance with the first set of factors, to operate the one or more air conditioning operation units.

2. The air conditioning system of claim 1, wherein the operations include:

modifying a respective value range of at least one of the plurality of predefined control parameters in the first operation profile in accordance with the first set of factors that has been determined based on the analysis of the one or more images through the one or more predefined machine learning models.

3. The air conditioning system of claim 1, wherein the first set of factors includes a position of a window in the surrounding environment of the one or more air conditioning operation units and the second set of factors includes an open/closed state of the window.

4. The air conditioning system of claim 3, wherein the first set of factors includes a position of a first type of furniture in the surrounding environment of the one or more air conditioning operation units, and the second set of factors includes presence or absence of people at the position of the first type of furniture in the surrounding environment of the one or more air conditioning operation units.

5. The air conditioning system of claim 4, wherein the second set of factors includes a motion state of the people at the position of the first type of furniture in the surrounding environment of the one or more air conditioning operation units.

6. The air conditioning system of claim 4, wherein the second set of factors includes a temperature state of the people at the position of the first type of furniture in the surrounding environment of the one or more air conditioning operation units.

7. A method of providing air conditioning, comprising:

at an electronic device having one or more processors and memory, the electronic device communicably coupled to one or more cameras and one or more air conditioning operation units:

obtaining, via the one or more cameras, one or more images of a surrounding environment of the air conditioning operation units;

determining a first set of factors, including a layout of the surrounding environment of the air conditioning operation units, based on analysis of the one or more images through one or more predefined machine learning models, wherein the layout specifies at least a first depth of the surrounding environment in a first direction away from the one or more air conditioning units, and a second depth of the surrounding environment in a second direction away from the one or more air conditioning units that is different from the first direction;

in accordance with the first set of factors that has been determined based on the analysis of the one or more images through the one or more predefined machine learning models, selecting a first operation profile from a plurality of predefined operation profiles, wherein each predefined operation profile of the plurality of operation profiles specifies a respective value range for each control parameter of a plurality of predefined control parameters for controlling the one or more air conditioning operation units;

determining a second set of factors, including a state of an object recognized in the surrounding environment of the air conditioning operation units, based on the analysis of the one or more images through the one or more predefined machine learning models; and in accordance with the second set of factors that has been determined based on the analysis of the one or more images through the one or more predefined machine learning models, selecting a current value of a first control parameter of the first operation profile within the respective value range that has been modified in accordance with the first set of factors, to operate the one or more air conditioning operation units.

8. The method of claim 7, including:

modifying a respective value range of at least one of the plurality of predefined control parameters in the first operation profile in accordance with the first set of factors that has been determined based on the analysis of the one or more images through the one or more predefined machine learning models.

9. The method of claim 7, wherein the first set of factors includes a position of a window in the surrounding environment of the one or more air conditioning operation units and the second set of factors includes an open/closed state of the window.

10. The method of claim 7, wherein the first set of factors includes a position of a first type of furniture in the surrounding environment of the one or more air conditioning operation units, and the second set of factors includes presence or absence of people at the position of the first type of furniture in the surrounding environment of the one or more air conditioning operation units.

11. The method of claim 10, wherein the second set of factors includes a motion state of the people at the position of the first type of furniture in the surrounding environment of the one or more air conditioning operation units.

12. The method of claim 10, wherein the second set of factors includes a temperature state of the people at the position of the first type of furniture in the surrounding environment of the one or more air conditioning operation units.

13. A non-transitory computer-readable storage medium storing instructions, the instructions, when executed by one or more processors of an electronic device that is communicably coupled to one or more cameras and one or more air conditioning operation units cause the processors to perform operations comprising:

obtaining, via the one or more cameras, one or more images of a surrounding environment of the air conditioning operation units;

determining a first set of factors, including a layout of the surrounding environment of the air conditioning operation units, based on analysis of the one or more images through one or more predefined machine learning models, wherein the layout specifies at least a first depth of the surrounding environment in a first direction away from the one or more air conditioning units, and a second depth of the surrounding environment in a second direction away from the one or more air conditioning units that is different from the first direction;

in accordance with the first set of factors that has been determined based on the analysis of the one or more images through the one or more predefined machine learning models, selecting a first operation profile from a plurality of predefined operation profiles, wherein each predefined operation profile of the plurality of operation profiles specifies a respective value range for each control parameter of a plurality of predefined control parameters for controlling the one or more air conditioning operation units;

determining a second set of factors, including a state of an object recognized in the surrounding environment of the air conditioning operation units, based on the analysis of the one or more images through the one or more predefined machine learning models; and in accordance with the second set of factors that has been determined based on the analysis of the one or more images through the one or more predefined machine learning models, selecting a current value of a first control parameter of the first operation profile within the respective value range that has been modified in accordance with the first set of factors, to operate the one or more air conditioning operation units.

14. The non-transitory computer-readable storage medium of claim 13, wherein the operations include:

modifying a respective value range of at least one of the plurality of predefined control parameters in the first operation profile in accordance with the first set of factors that has been determined based on the analysis of the one or more images through the one or more predefined machine learning models.

15. The non-transitory computer-readable storage medium of claim 13, wherein the first set of factors includes a position of a window in the surrounding environment of the one or more air conditioning operation units and the second set of factors includes an open/closed state of the window.

16. The non-transitory computer-readable storage medium of claim 13, wherein the first set of factors includes a position of a first type of furniture in the surrounding environment of the one or more air conditioning operation units, and the second set of factors includes presence or absence of people at the position of the first type of furniture in the surrounding environment of the one or more air conditioning operation units.

17. The non-transitory computer-readable storage medium of claim 16, wherein the second set of factors includes a motion state of the people at the position of the first type of furniture in the surrounding environment of the one or more air conditioning operation units.

\* \* \* \* \*